United States Patent
Yoshida et al.

(10) Patent No.: US 9,469,332 B2
(45) Date of Patent: Oct. 18, 2016

(54) COUPLING STRUCTURE FOR COUPLING SHAFT TO UNIVERSAL JOINT YOKE, COUPLING METHOD FOR COUPLING SHAFT TO UNIVERSAL JOINT YOKE, AND INTERMEDIATE SHAFT

(71) Applicant: JTEKT CORPORATION, Osaka-shi, Osaka (JP)

(72) Inventors: Atsuhiro Yoshida, Nara (JP); Naoji Kawasoko, Kashihara (JP); Osamu Honda, Fujiidera (JP); Nobuaki Shibata, Ikoma-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 101 days.

(21) Appl. No.: 14/084,101

(22) Filed: Nov. 19, 2013

(65) Prior Publication Data
US 2014/0147197 A1    May 29, 2014

(30) Foreign Application Priority Data
Nov. 27, 2012    (JP) .................................. 2012-258943

(51) Int. Cl.
| | |
|---|---|
| F16D 1/068 | (2006.01) |
| B62D 1/20 | (2006.01) |
| F16D 1/072 | (2006.01) |
| F16D 1/12 | (2006.01) |
| F16D 3/38 | (2006.01) |
| B62D 1/16 | (2006.01) |

(52) U.S. Cl.
CPC . *B62D 1/20* (2013.01); *B62D 1/16* (2013.01); *F16D 1/068* (2013.01); *F16D 1/072* (2013.01); *F16D 1/12* (2013.01); *F16D 3/387* (2013.01); *Y10T 29/4984* (2015.01); *Y10T 403/7026* (2015.01)

(58) Field of Classification Search
None
See application file for complete search history.

(56) References Cited

U.S. PATENT DOCUMENTS 2,394,405 A * 2/1946 Schjolin .................. 74/730.1
4,402,626 A * 9/1983 Recker .................... 403/328
(Continued)

FOREIGN PATENT DOCUMENTS

JP       03204417 A  *  9/1991  .............. F16D 3/06
JP    H10-267040 A      10/1998
(Continued)

OTHER PUBLICATIONS

Jun. 11, 2015 Search Report issued in European Patent Application No. 13193804.5.
(Continued)

*Primary Examiner* — Matthieu Setliff
(74) *Attorney, Agent, or Firm* — Oliff PLC

(57) ABSTRACT

In a coupling structure for coupling a shaft to a universal joint yoke, an insertion portion of a shaft is passed through an insertion hole of a universal joint yoke. An outward protrusion of a distal end portion of the shaft faces a peripheral edge of a first opening of the insertion hole across a gap in an axial direction. A fixed portion that adjoins the insertion portion is fixed to a peripheral edge of a second opening of the insertion hole by welding. An engaging portion formed on an outer periphery of the insertion portion and an engaged portion formed in an inner periphery of the universal joint yoke, which defines the insertion hole, are engageable with each other in a rotational direction with a rotation permitting gap for phase adjustment.

1 Claim, 7 Drawing Sheets

(56) References Cited

U.S. PATENT DOCUMENTS

| | | | | |
|---|---|---|---|---|
| 5,522,669 | A * | 6/1996 | Recker | 403/328 |
| 5,657,545 | A * | 8/1997 | Haworth et al. | 33/1 N |
| 5,827,122 | A * | 10/1998 | Kurian | 464/162 |
| 6,527,643 | B2 * | 3/2003 | Edi | 464/179 |
| 6,755,746 | B2 * | 6/2004 | Barnley et al. | 464/162 |
| 7,314,416 | B2 * | 1/2008 | Loughrin et al. | 464/182 |
| 7,905,297 | B2 * | 3/2011 | Fox et al. | 172/125 |
| 8,500,564 | B2 * | 8/2013 | Shibahiraki | 464/134 |
| 2003/0045366 | A1 * | 3/2003 | Loughrin et al. | 464/182 |
| 2005/0115339 | A1 * | 6/2005 | Aoki et al. | 74/7 C |
| 2006/0064872 | A1 * | 3/2006 | Shirai | 29/888.1 |
| 2009/0078437 | A1 * | 3/2009 | Fox et al. | 172/74 |
| 2012/0142439 | A1 * | 6/2012 | Shibahiraki | 464/153 |

FOREIGN PATENT DOCUMENTS

| | | | | | |
|---|---|---|---|---|---|
| JP | 11337453 | A * | 12/1999 | | |
| JP | 2001214943 | A * | 8/2001 | | F16D 1/04 |
| JP | 2005248855 | A * | 9/2005 | | F01L 13/00 |
| JP | 2006-038058 | A | 2/2006 | | |
| JP | 2007-040420 | A | 2/2007 | | |
| JP | 2009196386 | A * | 9/2009 | | |
| JP | A-2012-112509 | | 6/2012 | | |
| JP | 2013-035469 | A | 2/2013 | | |
| JP | 2013122266 | A * | 6/2013 | | |
| JP | 2013185686 | A * | 9/2013 | | |

OTHER PUBLICATIONS

Aug. 25, 2016 Office Action issued in Japanese Patent Application No. 2012-258943.

* cited by examiner

COUPLING STRUCTURE FOR COUPLING SHAFT TO UNIVERSAL JOINT YOKE, COUPLING METHOD FOR COUPLING SHAFT TO UNIVERSAL JOINT YOKE, AND INTERMEDIATE SHAFT

INCORPORATION BY REFERENCE

The disclosure of Japanese Patent Application No. 2012-258943 filed on Nov. 27, 2012 including the specification, drawings and abstract, is incorporated herein by reference in its entirety.

BACKGROUND OF THE INVENTION

1. Field of the Invention

The invention relates to a coupling structure for coupling a shaft to a universal joint yoke, a coupling method for coupling a shaft to a universal joint yoke, and an intermediate shaft.

2. Description of the Related Art

In an automobile, generally, a steering shaft coupled to a steering wheel that serves as a steering member and, for example, a pinion shaft that serves as a steering gear shaft are coupled to each other via an intermediate shaft. As such an intermediate shaft, a telescopic shaft is usually used. The telescopic shaft is formed by coupling an inner shaft and a tubular outer shaft to each other such that the inner shaft and the outer shaft are slidable relative to each other in the axial direction. An end portion of each of the inner shaft and the outer shaft of the intermediate shaft is coupled to a corresponding one of the steering shaft and the pinion shaft via a universal joint.

Conventionally, a yoke of each universal joint is integrally fixed to a corresponding one of shafts of an intermediate shaft by welding. According to Japanese Patent Application Publication No. 2012-112509 (JP 2012-112509 A), a yoke and a corresponding one of shafts of an intermediate shaft are fitted to each other by serration-fitting so that steering can be performed even if a welded potion is broken. Further, in order to prevent the shaft from coming off the yoke, a riveted portion, which is formed by expanding an insertion pipe-shaped distal end portion of the shaft outward in the radial direction, is provided so as not to be in contact with the yoke.

When the yoke and the shaft are fitted to each other by meshing their serration teeth with each other, it is possible to make only stepwise rough adjustment at every pitch of teeth, for example, at intervals of 10 degrees. For example, when an angular position at which one of the universal joint yokes is fitted to one end of the shaft is changed to adjust the phase between the one of the universal joint yokes and the other universal joint yoke fixed to the other end of the shaft, it is possible to make only stepwise rough adjustment. Therefore, the number of design variations of the intermediate shaft, which can be realized with the use of common parts, is limited. Therefore, it is not possible to obtain a mass production effect. As a result, the overall production cost increases.

When a failure, for example, a breakage of the welded portion occurs, it is still possible to transmit torque through the intermediate shaft because the serration teeth of the intermediate shaft and the serration teeth of the yoke mesh with each other. Thus, a fail-safe is achieved. However, a driver does not notice occurrence of the failure immediately after the failure occurs, and recognizes occurrence of the failure only after a slip of the serration teeth or the like occurs.

SUMMARY OF THE INVENTION

One object of the invention is to provide a coupling structure for coupling a shaft to a universal joint yoke, a coupling method for coupling a shaft to a universal joint yoke, and an intermediate shaft, which allow a driver to notice occurrence of a failure quickly and which are realized at low cost.

An aspect of the invention relates to a coupling structure for coupling a shaft to a universal joint yoke, including: a shaft rotatable about a central axis; and a universal joint yoke having an insertion hole through which the shaft is passed. The insertion hole has a first opening and a second opening that opens on an opposite side of the universal joint yoke from the first opening. The shaft has a distal end portion that has passed through the insertion hole and that protrudes from the first opening, an outward protrusion serving as a stopper, the outward protrusion extending from the distal end portion outward in a radial direction and facing a peripheral edge of the first opening across a gap in an axial direction, an insertion portion that adjoins the distal end portion and that is arranged in the insertion hole, and a fixed portion that adjoins the insertion portion and that is fixed to a peripheral edge of the second opening by welding. One of an inner periphery of the universal joint yoke, which defines the insertion hole, and an outer periphery of the insertion portion has an engaging portion. The other one of the inner periphery of the universal joint yoke, which defines the insertion hole, and the outer periphery of the insertion portion has an engaged portion. The engaging portion and the engaged portion are engageable with each other in a rotational direction with a rotation permitting gap for adjustment of a phase between the shaft and the universal joint yoke.

In the coupling structure according to the above-described aspect, the engaging portion formed in one of the inner periphery of the universal joint yoke, which defines the insertion hole, and the outer periphery of the insertion portion and the engaged portion formed in the other one of the inner periphery of the universal joint yoke, which defines the insertion hole, and the outer periphery of the insertion portion are engageable with each other with the rotation permitting gap for phase adjustment. Thus, during production, it is possible to adjust the phase between the shaft and the first universal joint yoke steplessly within the phase adjustment range. Accordingly, a lot of design variations regarding the phase can be realized with the use of common parts (the shaft and the universal joint yoke). As a result, the production cost can be reduced by a mass production effect.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
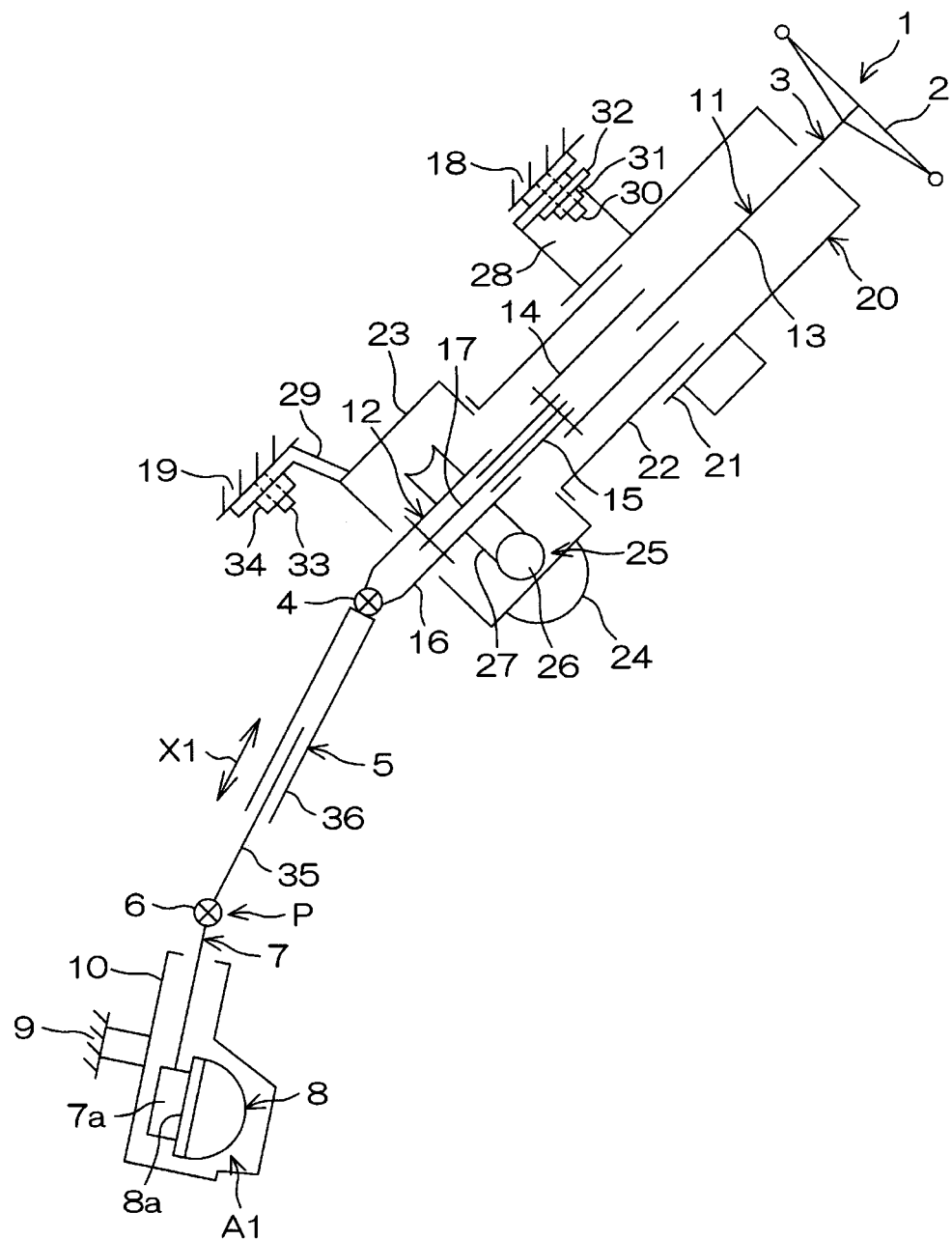
FIG. 1 is a view illustrating the schematic configuration of a steering system including an intermediate shaft to which a coupling structure for coupling a shaft to a universal joint yoke according to an embodiment of the invention is applied.

Example embodiments of the invention will be described with reference to the accompanying drawings. FIG. 1 is a view illustrating the schematic configuration of a steering system 1 including an intermediate shaft 5 to which a coupling structure P for coupling a shaft to a universal joint yoke according to an embodiment of the invention is applied. In the present embodiment, description will be provided on a case where the steering system 1 is an electric power steering system. However, the coupling structure P for coupling a shaft and a universal joint yoke and the intermediate shaft 5 according to the invention may be applied to a steering system for hydraulically assisted-type steering or a steering system for manual steering.

As illustrated in FIG. 1, the steering system 1 includes a steering shaft 3 coupled to a steering member 2 such a steering wheel, the intermediate shaft 5 coupled to the steering shaft 3 via a universal joint 4, a pinion shaft 7 coupled to the intermediate shaft 5 via a universal joint 6, a rack shaft 8 that serves as a steered shaft having a rack 8a that meshes with a pinion 7a provided near an end portion of the pinion shaft 7.

A rack-and-pinion mechanism that includes the pinion shaft 7 and the rack shaft 8 constitutes a steered mechanism A1. The rack shaft 8 is supported by a housing 10 fixed to a vehicle body-side member 9 so as to be movable in its axial direction (direction perpendicular to the sheet on which FIG. 1 is drawn) that extends along the lateral direction of a vehicle. Although not illustrated in the drawing, each end portion of the rack shaft 8 is coupled to a corresponding one of steered wheels via a corresponding one of tie rods and a corresponding one of knuckle arms.

The steering shaft 3 includes a first steering shaft 11 and a second steering shaft 12 that are coaxially coupled to each other. The first steering shaft 11 includes an upper shaft 13 and a lower shaft 14 that are fitted to each other by spline-fitting so as to be rotatable together with each other and slidable relative to each other in their axial direction. One of the upper shaft 13 and the lower shaft 14 constitutes an inner shaft, and the other one of the upper shaft 13 and the lower shaft 14 constitutes a tubular outer shaft.

The second steering shaft 12 includes an input shaft 15 coupled to the lower shaft 14 so as to be rotatable together with the lower shaft 14, an output shaft 16 coupled to the intermediate shaft 5 via the universal joint 4, and a torsion bar 17 that couples the input shaft 15 and the output shaft 16 to each other such that the input shaft 15 and the output shaft 16 are rotatable relative to each other. The steering shaft 3 is rotatably supported via a bearing (not illustrated) by a steering column 20 fixed to vehicle body-side members 18, 19.

The steering column 20 includes a tubular upper jacket 21 and a tubular lower jacket 22 that are fitted to each other so as to be movable relative to each other in the axial direction, and a housing 23 coupled to an axial lower end of the lower jacket 22. A speed reduction mechanism 25 is housed in the housing 23. The speed reduction mechanism 25 reduces the speed of rotation output from an electric motor 24 for steering assist and transmits the rotation, which serves as power, to the output shaft 16. The speed reduction mechanism 25 includes a drive gear 26 coupled to a rotary shaft (not illustrated) of the electric motor 24 so as to be rotatable together with the rotary shaft, and a driven gear 27 that meshes with the drive gear 26 and rotates together with the output shaft 16. The drive gear 26 is formed of a worm shaft, for example. The driven gear 27 is formed of, for example, a worm wheel.

The steering column 20 is fixed to the vehicle body-side members 18, 19 via an upper bracket 28 and a lower bracket 29 that is closer to the front of the vehicle than the upper bracket 28. The upper bracket 28 is fixable to the upper jacket 21 of the steering column 20 via a column bracket (not illustrated). The upper bracket 28 is fixed to the vehicle body-side member 18 with the use of a fixing bolt (stud bolt) 30 that protrudes downward from the vehicle body-side member 18, a nut 31 screwed to the fixing bolt 30, a capsule 32 removably held by the upper bracket 28.

Figure 2:
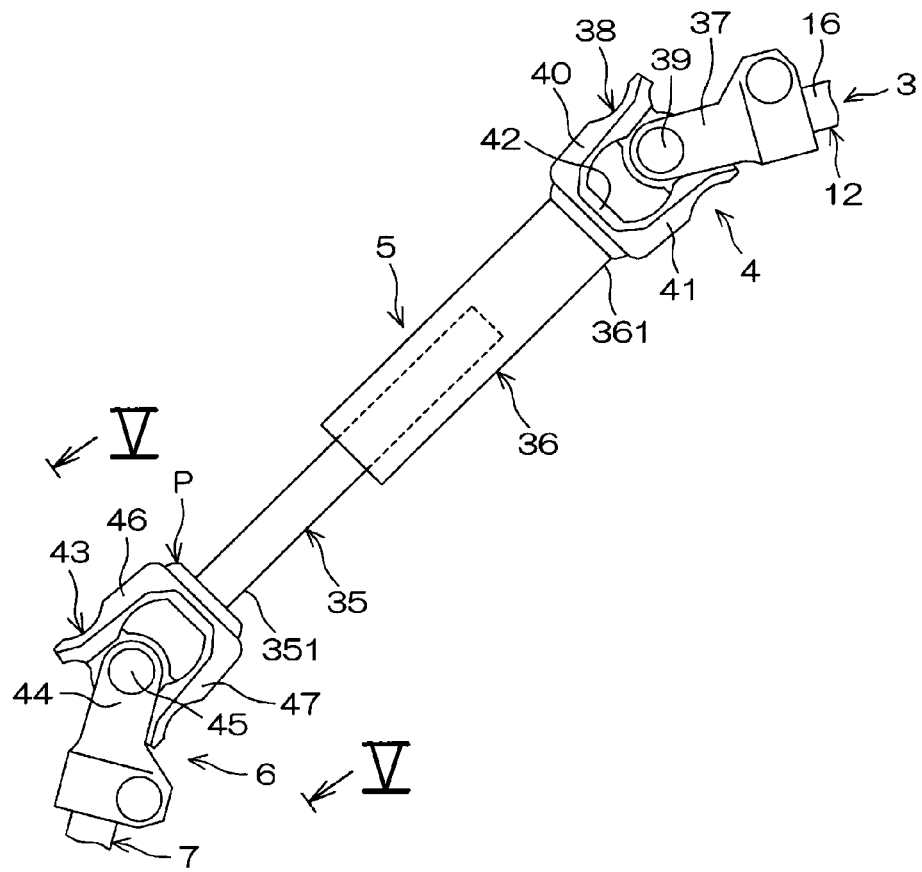
FIG. 2 is a side view schematically illustrating the intermediate shaft in FIG. 1.

The lower bracket 29 is fixed to the housing 23 of the steering column 20. The lower bracket 29 is fixed to the vehicle body-side member 19 with the use of a fixing bolt (stud bolt) 33 that protrudes from the vehicle body-side member 19 and a nut 34 screwed to the fixing bolt 33. As illustrated in FIG. 1 and FIG. 2, the intermediate shaft 5 is formed by fitting a shaft 35, which constitutes, for example, a lower shaft and a sleeve 36, which constitutes, for example, an upper shaft to each other through spline-fitting such that the shaft 35 and the sleeve 36 are slidable along an axial direction X1 and torque is transmittable therebetween.

The shaft 35 has one end 351 (a lower end in the axial direction), and the one end 351 is coupled to the universal joint 6. The sleeve 36 has one end 361 (an upper end in the axial direction), and the one end 361 is coupled to the universal joint 4. The universal joint 4 includes a pair of universal joint yokes 37, 38 and a joint cross 39 that couples the universal joint yokes 37, 38 to each other. The universal joint yoke 37 is fixed to the output shaft 16 of the second steering shaft 12 so as to be rotatable together with the output shaft 16. The universal joint yoke 38, which may function as a second universal joint yoke, has a pair of arms 40, 41 and a coupling portion 42 that couples the arms 40, 41 to each other so as to form a U-shape. The joint cross 39 has a pair of trunnions, and the arms 40, 41 are coupled to the corresponding trunnions. The coupling portion 42 is fixed to the one end 361 of the sleeve 36 of the intermediate shaft 5, for example, by welding so as to be rotatable together with the sleeve 36.

The universal joint 6 includes a pair of universal joint yokes 43, 44 and a joint cross 45 that couples the universal joint yokes 43,44 to each other. The universal joint yoke 43, which may function as a first universal joint yoke, has a pair of arms 46, 47 and a coupling portion 48 that couples the arms 46, 47 to each other so as to form a U-shape. The joint cross 43 has a pair of trunnions, and the arms 46, 47 are coupled to the corresponding trunnions. The coupling portion 48 is fixed to the one end 351 of the shaft 35 of the intermediate shaft 5 so as to be rotatable together with the shaft 35. The universal joint yoke 44 is fixed to one end of the pinion shaft 7 so as to be rotatable together with the pinion shaft 7.

Figure 3:
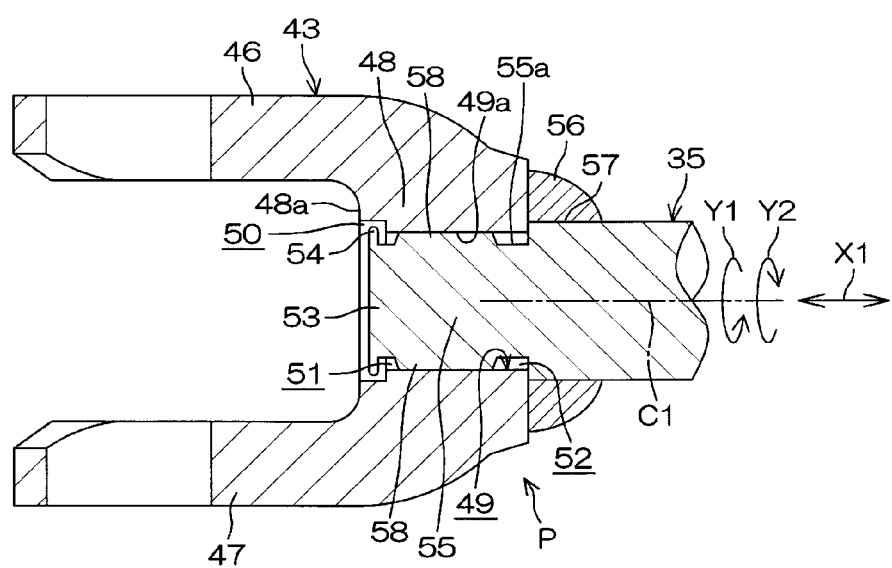
FIG. 3 is a sectional view illustrating a coupling structure for coupling a shaft of the intermediate shaft to a universal joint yoke, FIG. 3 corresponding to a section taken along the line III-III in FIG. 5.
Figure 4:
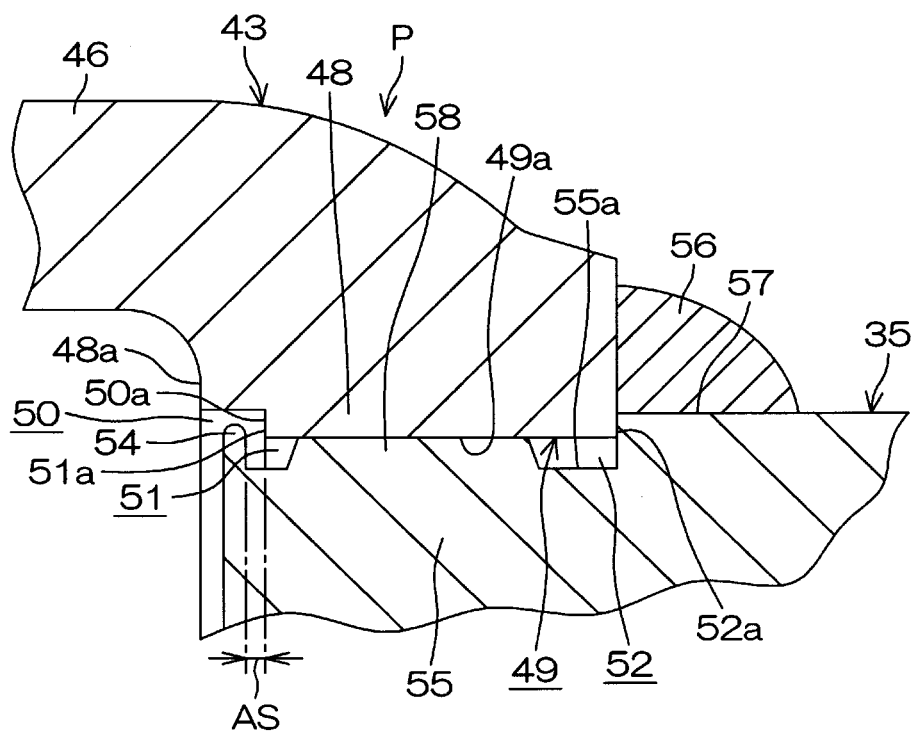
FIG. 4 is an enlarged sectional view illustrating part of the coupling structure in FIG. 3.

As illustrated in FIG. 3, which is an enlarged sectional view of the coupling structure P, and FIG. 4, which is an enlarged sectional view of part of the coupling structure P in FIG. 3, an insertion hole 49 through which the shaft 35 is passed is formed in the coupling portion 48 that couples base ends of the arms 46, 47 of the first universal joint yoke 43, to which the shaft 35 is coupled, so as to form a U-shape. An end face 48a of the coupling portion 48 forms an annular recess 50 that faces the joint cross 45. The insertion hole 49 has a first opening 51 that opens at a bottom 50a of the annular recess 50 and a second opening 52 that opens on the opposite side of the coupling portion 48 from the first opening 51.

The shaft 35 has a distal end portion 53 that has passed through the insertion hole 49 and that protrudes from a peripheral edge 51a of the first opening 51, and an outward protrusion 54 serving as a stopper. The outward protrusion 54 extends from the distal end portion 53 outward in the radial direction, and faces the peripheral edge 51 a of the first opening 51 across a gap AS (see FIG. 4) in the axial direction X1. The shaft 35 has an insertion portion 55 that adjoins the distal end portion 53 and that is arranged in the insertion hole 49, and a fixed portion 57 that adjoins the insertion portion 55 and that is fixed to a peripheral edge 52a of the second opening 52 via a welded portion 56.

The distal end portion 53 of the shaft 35 is housed in an inner space of the annular recess 50 and does not protrude from the end face 48a of the coupling portion 48. This prevents the distal end portion 53 from coming into contact with the universal joint yoke 44, thereby preventing the axis crossing angle of the universal joint 6 from being limited. The outward protrusion 54 is not in contact with the peripheral edge 51a of the first opening 51, and is not in contact with an inner periphery of the annular recess 50. Therefore, a stress applied to the universal joint yoke 43 is reduced.

Figure 5:
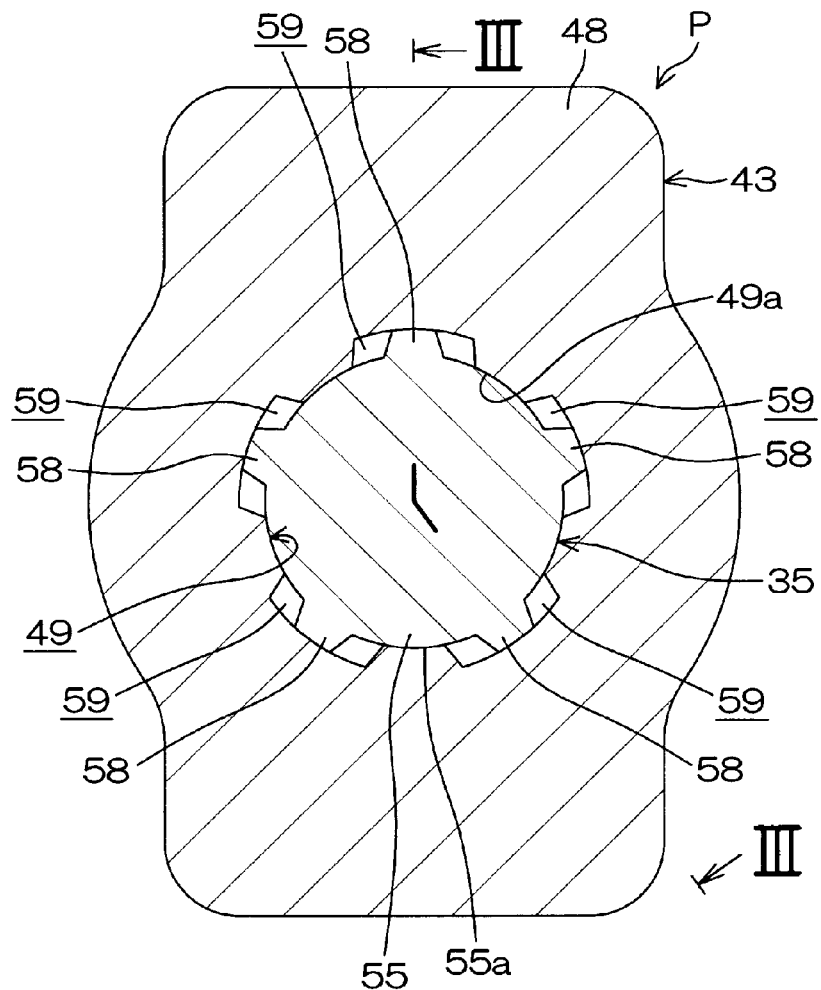
FIG. 5 is a cross-sectional view illustrating the coupling structure, FIG. 5 corresponding to a section taken along the line V-V in FIG. 2.
Figure 6:
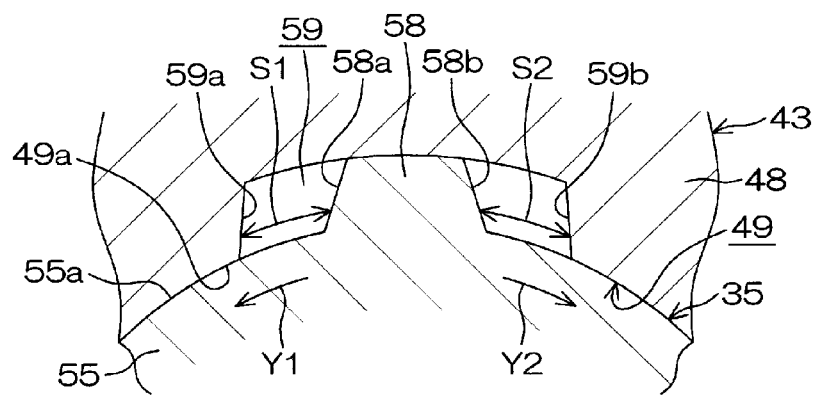
FIG. 6 is an enlarged sectional view illustrating part of the coupling structure in FIG. 5.

Engaging protrusions 58 are formed on one of an inner periphery 49a of the first universal joint yoke 43, which defines the insertion hole 49, and an outer periphery 55a of the insertion portion 55. As illustrated in FIG. 5, in the present embodiment, the engaging protrusions 58 are formed on the outer periphery 55a of the insertion portion 55. Engaged recesses 59 are formed in the other one of the inner periphery 49a of the first universal joint yoke 43, which defines the insertion hole 49, and the outer periphery 55a of the insertion portion 55. As illustrated in FIG. 5, in the present embodiment, the engaged recesses 59 are formed in the inner periphery 49a of the universal joint yoke 43, which defines the insertion hole 49. As illustrated in FIG. 6, a pair of engaging portions 58a, 58b is formed by a pair of outer faces of each engaging protrusion 58, which are located on the opposite sides of the engaging protrusion 58 in the rotational direction, and a pair of engaged portions 59a, 59b is formed by a pair of inner wall faces of each engaged recess 59.

The engaging portion 58a of the shaft 35 is engageable with a corresponding one of the engaged portions 59a, with a rotation permitting gap Si in a first rotational direction Y1. The rotation permitting gap S1 is used to adjust the phase between the shaft 35 and the first universal joint yoke 43. The engaging portion 58b of the shaft 35 is engageable with a corresponding one of the engaged portions 59b, with a rotation permitting gap S2 in a first rotational direction Y2. The rotation permitting gap S2 is used to adjust the phase between the shaft 35 and the first universal joint yoke 43.

Figure 7A:
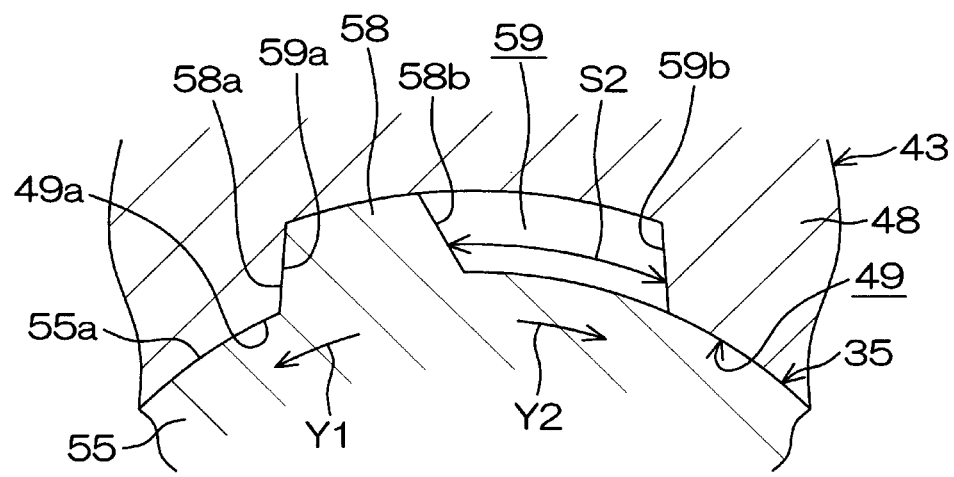
FIG. 7A is another enlarged sectional view schematically illustrating part of the coupling structure in FIG. 5, and describing an adjustment range for adjusting a phase between the shaft and the universal joint yoke through adjustment of a rotation permitting gap, FIG. 7A illustrating a state where the shaft is at one end of the adjustment range.
Figure 7B:
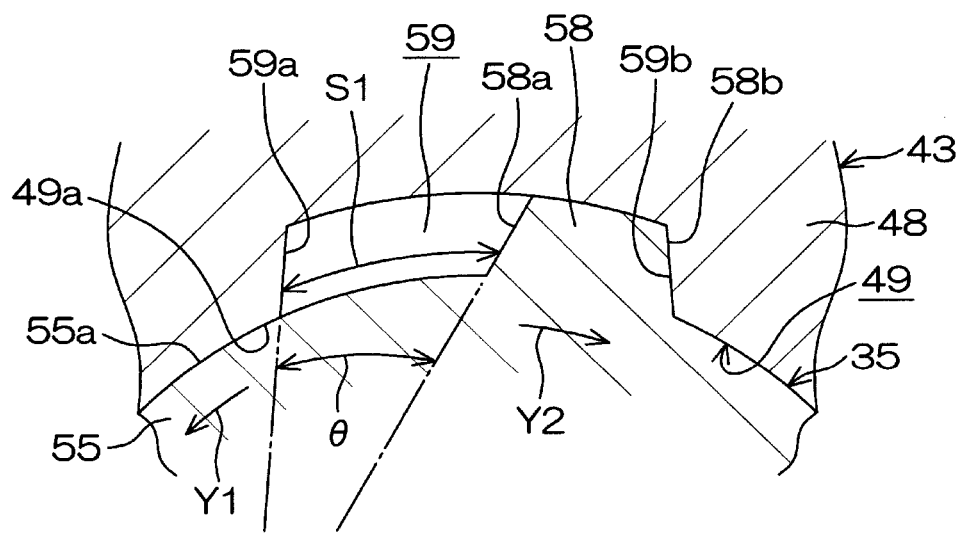
FIG. 7B is another enlarged sectional view schematically illustrating part of the coupling structure in FIG. 5, and describing the adjustment range for adjusting the phase between the shaft and the universal joint yoke through adjustment of the rotation permitting gap, FIG. 7B illustrating a state where the shaft is at the other end of the adjustment range.

FIG. 7A illustrates a state where the rotation permitting gap Si that permits the shaft 35 to rotate in the first rotational direction Y1 becomes zero and the engaging portion 58a is engaged with the engaged portion 59a. FIG. 7B illustrates a state where the rotation permitting gap S2 that permits the shaft 35 to rotate in the second rotational direction Y2 becomes zero and the engaging portion 58b is engaged with the engaged portion 59b. The phase adjustment range achieved by the rotation permitting gaps S1, S2 is set to a range equal to or larger than 5° and equal to or smaller than 30° (5°≤θ≤30), where θ is a relative rotation angle between the shaft 35 and the first universal joint yoke 43.

Figure 8A:
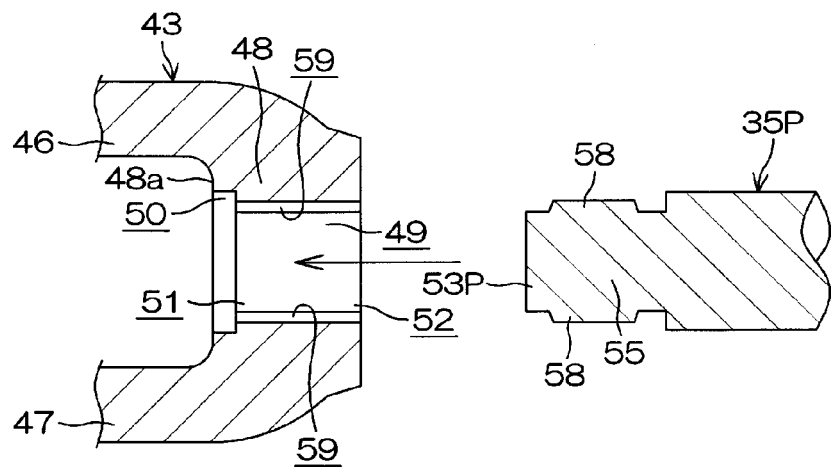
FIG. 8A is a process drawing illustrating a coupling method for coupling a shaft to a universal joint yoke, the drawing showing a partial sectional view of the coupling structure similar to that illustrated in FIG. 3.
Figure 8B:
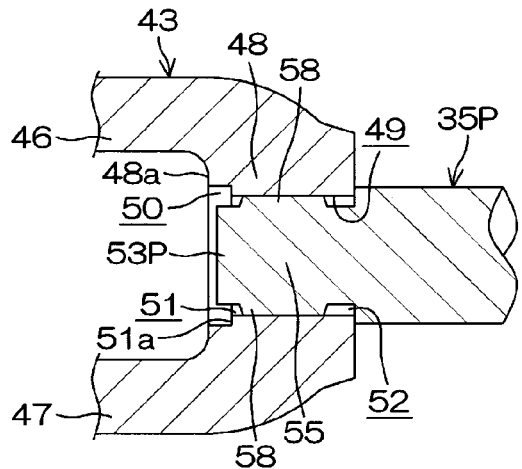
FIG. 8B is a process drawing illustrating the coupling method for coupling the shaft to the universal joint yoke, the drawing showing a partial sectional view of the coupling structure similar to that illustrated in FIG. 3.

Next, with reference to FIG. 8A, FIG. 8B, FIG. 8C, FIG. 9A, and FIG. 9B, a coupling method for coupling a shaft to a universal joint yoke will be described. As illustrated in FIG. 8A, the insertion portion 55 of a shaft workpiece 35P in which the engaging portions 58a, 58b are formed (not illustrated in FIG. 8A, see FIG. 6) is inserted into the insertion hole 49 through the second opening 52 of the insertion hole 49 of the universal joint yoke 43 in which the engaged portions 59a, 59b are formed (not illustrated in FIG. 8A, see FIG. 6). Subsequently, as illustrated in FIG. 8B, the distal end portion 53 of the shaft workpiece 35P is protruded from the peripheral edge 51a of the first opening 51 of the insertion hole 49.

Figure 8C:
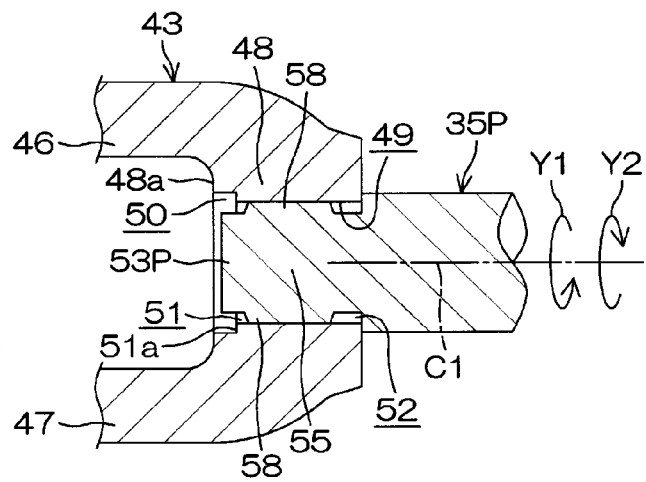
FIG. 8C is a process drawing illustrating the coupling method for coupling the shaft to the universal joint yoke, the drawing showing a partial sectional view of the coupling structure similar to that illustrated in FIG. 3.

Next, as illustrated in FIG. 8C, the universal joint yoke 43 is rotated in the first rotational direction Y1 or the second rotational direction Y2 with respect to the shaft workpiece 35P. As illustrated in FIG. 7C and FIG. 7B, the phase of the shaft workpiece 35P with respect to the universal joint yoke 43 is adjusted by adjusting the rotation permitting gaps S1, S2 between the engaging portions 58a, 58b and the engaged portions 59a, 59b.

Figure 9A:
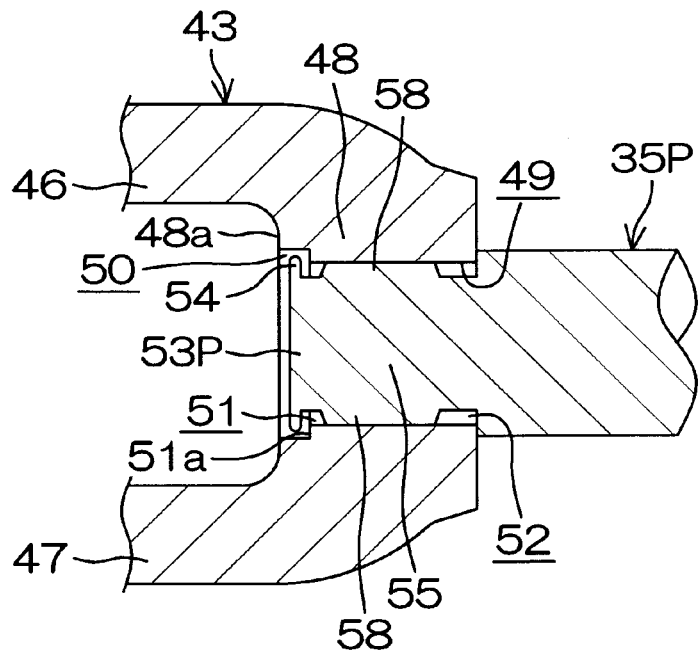
FIG. 9A is a process drawing illustrating a process subsequent to a process in FIG. 8C, in the coupling method for coupling the shaft to the universal joint yoke, the drawing showing a partial sectional view of the coupling structure similar to that illustrated in FIG. 3.
Figure 9B:
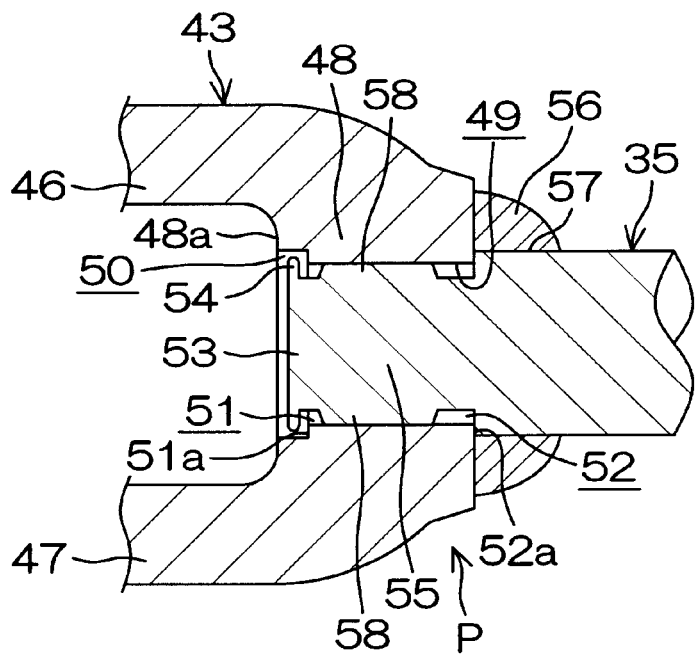
FIG. 9B is a process drawing illustrating a process subsequent to a process in FIG. 9A, in the coupling method for coupling the shaft to the universal joint yoke, the drawing showing a partial sectional view of the coupling structure similar to that illustrated in FIG. 3.

Subsequently, as illustrated in FIG. 9A, a working such as rolling riveting is performed on a distal end portion 53P of the shaft workpiece 35P to form the outward protrusion 54 that protrudes from the distal end portion 53P outward in the radial direction. The outward protrusion 54 thus formed faces the peripheral edge 51a of the first opening 51 across the gap AS in the axial direction X1 (see FIG. 4). Next, as illustrated in FIG. 9B, a portion of the shaft workpiece 35P, which is close to the peripheral edge 52a of the second opening 52 of the insertion hole 49, is fixed to the peripheral edge 52a of the second opening 52 by welding to form the fixed portion 57. In this way, the coupling structure P is obtained.

With the coupling structure P and the intermediate shaft 5 according to the present embodiment, the engaging portions 58a, 58b formed on the outer periphery 55a of the insertion portion 55 of the shaft 35 and the engaged portions 59a, 59b formed in the inner periphery 49a of the first universal joint yoke 43, which defines the insertion hole 49, are engageable with each other in the rotational directions with the rotation permitting gaps S1, S2 used for phase adjustment. Thus, during production, it is possible to adjust the phase of the shaft 35 with respect to the first universal joint yoke 43 steplessly within the phase adjustment range defined by the rotation permitting gaps S1, S2. Accordingly, a lot of design variations regarding the phase can be realized with the use of the shaft 35 and the universal joint yoke 43, which are common parts. As a result, the production cost can be reduced by a mass production effect.

When a failure, that is, a breakage of the welded portion 56 occurs, a backlash corresponding to the rotation permitting gaps S1, S2 is generated in the rotational directions between the shaft 35 and the first universal joint yoke 43 during transmission of torque. Thus, a driver is allowed to quickly recognize occurrence of the failure. Further, the outward protrusion 54 of the distal end portion 53 of the shaft 35 is engaged with the peripheral edge 51a of the first opening 51 of the insertion hole 49 of the first universal joint yoke 43, whereby the shaft 35 is restrained from coming off the first universal joint yoke 43.

Further, the phase adjustment range is set to a range equal to or larger than 5°, whereby the driver is allowed to reliably recognize occurrence of the failure. In addition, if the phase adjustment range is set to a range equal to or larger than 5° and equal to or smaller than 30°, a sufficient number of design variations regarding the phase can be realized, and it is possible to prevent generation of excessively large backlash during transmission of torque when a failure has occurred, thereby allowing appropriate steering that is an appropriate torque transmission operation. In addition, according to the coupling method in the present embodiment, the phase is adjusted by rotating the universal joint yoke 43 and the shaft workpiece 35P relative to each other, and then the outward protrusion 54 is formed in the distal end portion 53P of the shaft workpiece 35P. Next, the shaft workpiece 35P is fixed to the peripheral edge 52a of the second opening 52 by welding to form the fixed portion 57, whereby the structure P for coupling the shaft to the universal joint yoke is obtained. The phase is adjusted before the outward protrusion 54 serving as a stopper is formed in the distal end portion 53P of the shaft workpiece 35P. Thus, it is possible to adjust the phase smoothly. With the coupling structure P thus obtained, it is possible to produce the same effects as those of the above-described coupling structure P.

The invention is not limited to the above-described embodiment. For example, in the above-described embodiment, as illustrated in FIG. 4, the first opening 51 of the insertion hole 49 opens at the bottom 50a of the annular recess 50 formed in the end face 48a of the coupling portion 48. However, the invention is not limited to this configuration. Although not illustrated in the drawings, the annular recess 50 may be omitted, and the first opening 51 may open at the end face 48a of the coupling portion 48. In the above-described embodiment, as illustrated in FIG. 6, the engaging protrusions 58 each having a pair of the engaging portions 58a, 58b is formed on the outer periphery 55a of the insertion portion 55 of the shaft 35, and the engaged recesses 59 each having a pair of the engaged portions 59a, 59b is formed in the inner periphery 49a of the universal joint yoke 43, which defines the insertion hole 49. However, the invention is not limited to this configuration. Although not illustrated in the drawings, engaged recesses 59 each having a pair of engaged portions 59a, 59b may be formed in the outer periphery 55a of the insertion portion 55 of the shaft 35, and engaging protrusions 58 each having a pair of engaging portions 58a, 58b may be formed on the inner periphery 49a of the universal joint yoke 43, which defines the insertion hole 49.

What is claimed is:

1. A coupling method comprising steps of:
   inserting an insertion portion of a shaft workpiece, in which one of an engaging portion and an engaged portion is formed, through a second opening of an insertion hole of a universal joint yoke, in which another one of the engaging portion and the engaged portion is formed, a distal end portion of the shaft workpiece protruding from a first opening of the insertion hole;
   adjusting a phase between the shaft workpiece and the universal joint yoke by adjusting a rotation permitting gap between the engaging portion and the engaged portion through relative rotation between the universal joint yoke and the shaft workpiece, an adjustment range being set to a range equal to or larger than 5° and equal to or smaller than 30° in a relative rotation angle between the shaft workpiece and the universal joint yoke:
   forming an outward protrusion that protrudes from the distal end portion of the shaft workpiece outward in a radial direction and that faces a peripheral edge of the first opening across a gap in an axial direction; and
   forming a fixed portion by fixing a portion of the shaft workpiece that is close to a peripheral edge of the second opening of the insertion hole to the peripheral edge of the second opening by welding, wherein the steps of the method are successively performed in an order of the inserting, the adjusting, the forming of the outward protrusion, and the forming of the fixed portion, such that the phase between the shaft workpiece and the universal joint yoke is fixed.

* * * * *